(12) United States Patent
Ergin et al.

(10) Patent No.: US 9,831,657 B2
(45) Date of Patent: Nov. 28, 2017

(54) DEVICE FOR SWITCHING A DIRECT CURRENT IN A POLE OF A DC VOLTAGE NETWORK

(71) Applicant: SIEMENS AKTIENGESELLSCHAFT, Munich (DE)

(72) Inventors: Dominik Ergin, Baiersdorf (DE); Hans-Joachim Knaak, Erlangen (DE); Richard Zenger, Nuremberg (DE)

(73) Assignee: Siemens Aktiengesellschaft, Munich (DE)

(*) Notice: Subject to any disclaimer, the term of this patent is extended or adjusted under 35 U.S.C. 154(b) by 271 days.

(21) Appl. No.: 14/653,983

(22) PCT Filed: Dec. 19, 2012

(86) PCT No.: PCT/EP2012/076205
§ 371 (c)(1),
(2) Date: Jun. 19, 2015

(87) PCT Pub. No.: WO2014/094847
PCT Pub. Date: Jun. 26, 2014

(65) Prior Publication Data
US 2015/0333496 A1   Nov. 19, 2015

(51) Int. Cl.
*H02H 3/08* (2006.01)
*H01F 38/14* (2006.01)
(Continued)

(52) U.S. Cl.
CPC .......... *H02H 3/08* (2013.01); *H01F 27/2823* (2013.01); *H01F 27/29* (2013.01); *H01F 38/14* (2013.01);
(Continued)

(58) Field of Classification Search
CPC ....... H02H 3/08; H01F 38/14; H01F 27/2823; H01F 27/29; H01H 9/542; H01H 33/596; H01H 2201/008; H01H 9/548
See application file for complete search history.

(56) References Cited

U.S. PATENT DOCUMENTS

| | | |
|---|---|---|
| 4,110,806 A | 8/1978 | Murano et al. |
| 4,956,738 A | 9/1990 | Defosse et al. |

(Continued)

FOREIGN PATENT DOCUMENTS

| | | |
|---|---|---|
| CN | 1617281 A | 5/2005 |
| CN | 101919017 A | 12/2010 |

(Continued)

*Primary Examiner* — Zeev V Kitov
(74) *Attorney, Agent, or Firm* — Laurence Greenberg; Werner Stemer; Ralph Locher

(57) ABSTRACT

A device for switching a direct current in a pole of a direct current network includes two connecting terminals to be connected in series with the pole, an operating current path extending between the connecting terminals, at least one mechanical switch in the operating current path, a disconnection branch including a power switching unit for shutting down high short-circuit currents having power semiconductor switches that can be switched on and off, and a commutation device for commutating a current from the operating current path to the disconnection branch. In order to provide such a device which is economical, generates fewer losses and at the same time is able to switch high short-circuit currents quickly, the commutation device is provided with at least one inductive component.

13 Claims, 4 Drawing Sheets

(51) Int. Cl.
　　　*H01F 27/28*　　　(2006.01)
　　　*H01F 27/29*　　　(2006.01)
　　　*H01H 9/54*　　　(2006.01)
　　　*H01H 33/59*　　　(2006.01)

(52) U.S. Cl.
　　　CPC .......... *H01H 9/542* (2013.01); *H01H 33/596* (2013.01); *H01H 9/548* (2013.01); *H01H 2201/008* (2013.01)

(56) References Cited

U.S. PATENT DOCUMENTS

| | | | |
|---|---|---|---|
| 7,508,636 | B2 | 3/2009 | Sellier et al. |
| 8,284,528 | B2 | 10/2012 | Koshin et al. |
| 8,717,716 | B2 | 5/2014 | Häfner et al. |
| 9,159,511 | B2 | 10/2015 | Kostovic |
| 2012/0218676 | A1* | 8/2012 | Demetriades .......... H01H 9/542 361/115 |
| 2012/0286589 | A1 | 11/2012 | Kostovic |
| 2015/0222111 | A1* | 8/2015 | Magnusson ............ H01H 9/542 361/91.5 |

FOREIGN PATENT DOCUMENTS

| | | |
|---|---|---|
| CN | 102687221 A | 9/2012 |
| CN | 102780201 A | 11/2012 |
| DE | 2700375 A1 | 7/1977 |
| EP | 0184566 A1 | 6/1986 |
| EP | 1538645 A1 | 6/2005 |
| EP | 2523205 A1 | 11/2012 |
| WO | 2011057675 A1 | 5/2011 |

\* cited by examiner

DEVICE FOR SWITCHING A DIRECT CURRENT IN A POLE OF A DC VOLTAGE NETWORK

BACKGROUND OF THE INVENTION

Field of the Invention

Such a device is known, for example, from WO 2011/057675. The DC voltage switch explained therein has an operating current path comprising a mechanical switch and a disconnection branch, which is connected in parallel with the operating current path. A series circuit comprising power semiconductor switches is arranged in the disconnection branch, with in each case one freewheeling diode being connected in opposition in parallel with said power semiconductor switches. The switching units consisting of power semiconductor switches and freewheeling diode are arranged back-to-back in series, wherein the power semiconductor switches which can be switched off are arranged in series and a corresponding power semiconductor switch with opposite forward direction is provided for each power semiconductor switch. In this way, the current can be interrupted in both directions in the disconnection branch. In the operating current path, furthermore active commutation means are arranged in the configuration of an electronic auxiliary switch. During normal operation, an operating current flows via the operating current path and therefore via the closed mechanical switch since the power semiconductor switches of the disconnection branch represent an increased resistance for the direct current. In order to interrupt a short-circuit current as fault current, for example, the electronic auxiliary switch is transferred to its off position. As a result, the resistance in the operating current path increases, and therefore the direct current commutates into the disconnection branch. The quick-action mechanical switch disconnector can therefore be opened in the deenergized state. The short-circuit current passed via the disconnection branch can now be interrupted by the power semiconductor switches. In order to absorb the energy stored in the DC voltage grid and to be decayed during switching, diverters are provided, which are connected in parallel with the power semiconductor switches of the disconnection branch.

In addition to such an active power electronics commutation device, DC voltage switches have been described in which the commutation of the total current takes place owing to the arc voltage of the mechanical switch which is arranged in the operating current path. It is also known that a power electronics component part in the disconnection branch can provide active commutation. In this case, the power electronics component part in the mesh formed from the operating current path and the disconnection branch generates a circulating current, which is in opposition to the operating or fault current in the operating current path. In the switch, the two currents are superimposed on one another to give zero given corresponding driving of the power semiconductors so that the switch can be opened in the deenergized state. For such active commutation, the power semiconductor switches need to provide a high power very quickly since the current increases very quickly in the event of a short circuit.

BRIEF SUMMARY OF THE INVENTION

The object of the invention therefore consists in providing a device of the type mentioned at the outset which is inexpensive, generates few losses and at the same time switches high fault currents quickly.

The invention achieves this object by virtue of the fact that the commutation means have at least one inductive component part.

In accordance with the invention, inductive elements or component parts are used in order to assist the commutation in the event of a current rise, for example triggered by a short circuit. During normal operation, the total operating current flows in the steady state completely via the mechanical switch(es) since much higher voltage drops would arise in the power electronics of the disconnection branch in the event of a current flow than in the mechanical switch itself and an inductive component part possibly connected in series therewith. In order to achieve this desired steady state more quickly, in which the current flows via the operating current path, the power electronics can also be controlled in the high-resistance state. In other words, the power semiconductor switches of the power switching unit can be transferred to their off position in order to conduct the operating or load current safely via the operating path.

A constant load current which is flowing in the operating current path will also continue to flow in the operating current path in the event of a short circuit downstream of the device according to the invention in the direction of current flow. A fault current with a gradient which is determined primarily by the inductance of the grid $L_N$ is deflected automatically into the disconnection branch by the inductance of the inductive component part(s), which is low in relation to the line inductance but high in relation to the inductance of the power switching unit. The power electronics, whether these be part of the power switching unit or an auxiliary switch in the operating current path, therefore no longer need to commutate the load current and the fault current jointly out of each mechanical switch to be opened into the power switching unit, but only the load current, within the scope of the invention.

In accordance with a preferred configuration, at least two inductive component parts are provided, which are inductively coupled to one another. With the aid of the inductive coupling of inductive component parts which are arranged in different branches of the switch, the commutation can be set even better. Furthermore, it is possible to suppress the current flow via the switch and therefore to open the mechanical switch in the virtually deenergized state without any active commutation.

Advantageously, in addition to the inductive component part(s), the commutation means have drivable power semiconductor switches, which are at least partially designed to generate a back-emf which suppresses the fault currents in the mechanical switch(es) to be opened. Such active commutation means are described in further detail further below. Owing to the inductive component parts, the active commutation means can be less expensive.

In accordance with an expedient configuration in this regard, the drivable power semiconductor switches have at least one thyristor arranged in the operating current path. The thyristor(s) is/are combined with a regulation or control unit, within the scope of the invention. Said control unit ensures, for example, that the rated current can flow in the respectively required directions via the thyristor during normal operation of the network. For this purpose, the thyristor is continuously fired, for example. In the event of a fault, however, the thyristor suppresses an undesired current flow via the mechanical switch(es) to be opened. This can take place by expedient driving. Expediently, a surge arrestor or another overvoltage protection means is arranged in parallel with each thyristor.

In accordance with a first variant of the invention, two mechanical switches are arranged in the operating current path, wherein a shunt current branch extends in a parallel circuit with respect to the operating current path between the connection terminals, in which shunt current branch likewise two mechanical switches and/or two power semiconductors are arranged, wherein the disconnection branch connects a central branch potential point of the operating current path, which central branch potential point is arranged between the mechanical switches, to a central branch potential point of the shunt current branch, which central branch potential point is arranged between the mechanical switches or the power semiconductors. In accordance with this advantageous development, a so-called H circuit is provided, which is provided with inductive component parts to assist the commutation. In the case of a so-called H bridge, the current preferably flows via the operating current path. However, in principle, a complete symmetrical configuration of the so-called H bridge is also possible. The operating current can flow both via the operating current path and also via the shunt current branch in the case of a symmetrical configuration. The H circuit has the advantage that, independently of the direction of current flow via the switch, said current is always commutated into the central branch for switching. The power switching unit arranged there then needs to be able to switch the current only in one direction. In the event of a short circuit, the inductive component parts assist the commutation both of the operating current and of the short-circuit current into the disconnection branch, where disconnection of the currents takes place.

Expediently, each inductive component part is arranged between the central branch potential point of the operating current path and a switch and/or between the central branch potential point of the shunt current branch and one of the switches or the power semiconductors.

In accordance with an expedient development in this regard, at least one inductive component part is arranged in the disconnection branch and is inductively coupled to at least one inductive component part of the operating current path and/or the shunt current path.

In one variant of the invention which deviates from the H circuit, the operating current path can be bypassed by the disconnection branch. In accordance with this advantageous development, the device according to the invention, i.e. the DC voltage circuit breaker according to the invention, has only two branches in parallel with one another, namely the operating current path and the disconnection branch which at least sometimes bypasses said operating current path. The commutation means are arranged in the form of inductive component parts in the operating current path, in the disconnection branch and/or possibly between a connection terminal and the junction between the operating current path and the disconnection branch.

Advantageously, at least one inductive component part is arranged in that section of the operating current path which is bypassed by the disconnection branch. During normal operation, the load current flows via the operating current path in which the inductive component part(s) is/are arranged. Since the current does not change, no voltage is induced in the inductive component part. In the event of a short circuit downstream of the device according to the invention, when viewed in the direction of the operating current, the current increases quickly. The rate of rise is again determined by the inductance of the connected DC voltage network. The steep current rise effects a voltage in the inductive component part which ensures commutation of the short-circuit current into the disconnection branch. Only a small proportion of the short-circuit current will continue to flow via the operating current branch, including the switch. In order to commutate this proportion into the disconnection branch as well, the power electronics of the power switching unit can generate a voltage, for example, which drives a current in the mesh formed by the disconnection branch and that section of the operating current path which is bypassed by said disconnection branch, said current being in opposition to the operating current in the mechanical switches to be opened. A zero current crossing in the switch(es) is ensured, so that said switches can be opened as far as possible in the deenergized state. The formation of an arc is thus avoided or can be quenched quickly.

In accordance with a different variant of the invention in this regard, an inductive component part is arranged between a connection terminal and the junction between the operating current path and the disconnection branch and is inductively coupled to a further inductive component part, which is arranged in that section of the operating current path which is bypassed by the disconnection branch or in the disconnection branch itself. In accordance with this advantageous development of the invention, not only a single inductance, i.e. a single inductive component part, but a plurality of inductive component parts are used, which are coupled inductively to one another. In particular, these inductive component parts are coupled to one another via a ferromagnetic material, for example an iron core, or an iron yoke or a yoke consisting of an otherwise ferromagnetic material. In this case, the operating current is always flowing through one of the inductive component parts. The other inductive component part is only located in one of the two current paths, namely either in the operating current path or in the disconnection branch. Owing to this arrangement, further advantages can be achieved within the scope of the invention. Thus, with this configuration of the invention, complete commutation of the current from the operating current path into the disconnection branch can take place purely owing to the inductive component parts, as illustrated in further detail here.

Advantageously, an inductive component part is arranged between each connection terminal and each junction between the operating current path and the disconnection branch and is inductively coupled to a further inductive component part, which is arranged in the operating current path or in the disconnection branch.

In accordance with an advantageous development, the inductive component parts which are inductively coupled to one another have windings, which have mutually opposite winding directions. In accordance with this advantageous development, the magnetic fluxes generated by the inductive component parts in the core used for coupling compensate for one another so that the current flow is preferred in one direction, i.e. via the disconnection current branch, for example. This considerably assists with the commutation. In this case, it is expedient, for example, if the number of windings of the two inductive component parts which are coupled inductively to one another is the same. As a deviation from this, the number of windings of the two inductive component parts which are coupled inductively to one another is different. In accordance with this variant, it is possible to generate a circulating current in the mesh formed by the disconnection branch and that section of the operating current path which is bypassed thereby, which circulating current ensures that a current zero crossing is generated in the operating current path. Thus, the mechanical switch can be opened virtually in the deenergized state.

In accordance with a preferred configuration of the invention, the power switching unit has a series circuit comprising two-pole sub modules having at least one power semiconductor switch and means for decaying energy released during switching. The configuration of the sub modules is in principle as desired within this scope. Thus, each sub module can have, for example, only one power semiconductor switch which can be switched on and off, which either has reverse conductivity or else has a freewheeling diode connected in parallel in opposition therewith.

However, it is preferred within the scope of the invention for each sub module to have a dedicated energy store and a power semiconductor circuit connected in parallel with the energy store, so that either the voltage drop across the energy store or else a zero voltage can be generated at the two connection terminals of each sub module. The power semiconductor circuit can form, with the respective energy store, a so-called full-bridge circuit or else a half-bridge circuit. In the case of a full-bridge circuit, four power semiconductor switches which can be switched on and off, such as IGBTs, GTOs, IGCTs or the like, for example, are used. The four power semiconductor switches are arranged in two series circuits, each comprising two power semiconductor switches. Each of said series circuits is connected in parallel with the energy store, wherein one sub module connection terminal is connected to the potential point between the power semiconductor switches of the first series circuit and the second sub module connection terminal is connected to the potential point between the power semiconductor switches of the second series circuit. Thus, either the voltage drop across the energy store, a zero voltage or else the inverse energy store voltage can be generated at the two sub module connection terminals.

In the case of a half-bridge circuit, only two power semiconductor switches are provided, which are arranged in a single series circuit, which is connected in parallel with the energy store. A sub module connection terminal is again connected to the potential point between the power semiconductor switches of said series circuit. The second sub module connection terminal is present directly at one pole of the energy store. Thus, either the voltage drop across the energy store or else a zero voltage can be generated at the sub module connection terminals.

In a further expedient configuration of the invention, the commutation means have exclusively inductive component parts. Owing to this advantageous development, power electronics, i.e. active, commutation means can be dispensed with entirely. However, switching in accordance with this advantageous development is only possible when fault currents i with a sufficiently large di/dt occur. An operating current cannot be switched with the aid of commutation means based exclusively on inductive component parts.

BRIEF DESCRIPTION OF THE SEVERAL VIEWS OF THE DRAWING

Further expedient configurations and advantages of the invention are the subject matter of the description below relating to exemplary embodiments of the invention with reference to the figures in the drawing, wherein the same reference symbols refer to functionally identical component parts, and wherein.

DESCRIPTION OF THE INVENTION

Figure 1:
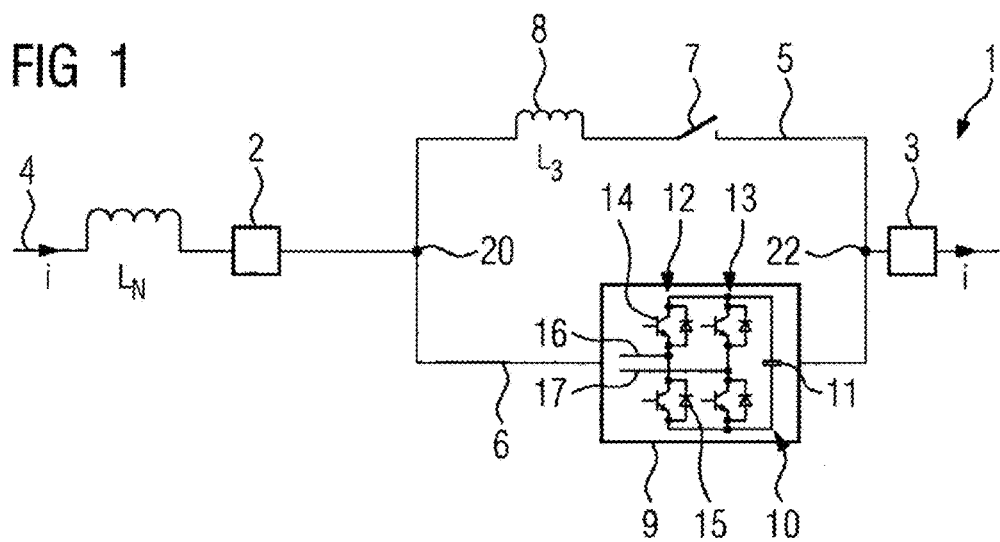
FIG. 1 shows a first exemplary embodiment of the device according to the invention.

FIG. 1 shows a first exemplary embodiment of the device 1 according to the invention, which has two connection terminals 2 and 3, with which the device 1 is connected in series into a pole 4, in other words a conductor, of a DC voltage network, which is not illustrated in any further detail in the figures. The pole 4 has the line inductance $L_N$ illustrated schematically in FIG. 1.

The device 1 has an operating current path 5, which is bypassed by a disconnection branch 6. A mechanical switch 7 which opens quickly and an inductive component part 8 having the inductance $L_3$ are arranged in the operating current path 5. The inductive component part 8 is a coil or an inductor, for example. A power switching unit 9 is arranged in the disconnection branch 6, said power switching unit having a series circuit comprising two-pole sub modules 10, of which only one sub module 10 is illustrated in FIG. 1.

Each sub module 10 has an energy store 11, with which two series circuits 12 and 13, each comprising two power semiconductor switches 14 which can be switched on and off, such as IGBTs, IGCTs or GTOs, for example, are connected in parallel. A freewheeling diode 15 is connected in parallel in opposition with each power semiconductor switch 14. A first sub module connection terminal 16 is connected to a potential point between the power semiconductor switches 14 of the first series circuit 12, and the second sub module connection terminal 17 is connected to the potential point between the power semiconductor switches 14 of the second series circuit 13. Thus, the capacitor voltage drop Uc across the energy store, in this case a capacitor 11, a zero voltage or else the inverse capacitor voltage—Uc can be generated at said sub module connection terminals 16 and 17.

In addition, the power switching unit 9 comprises diverters (not illustrated in the figures) for dissipating the energy released during switching. If the power semiconductor switches 14 of the sub modules 10 are driven in such a way that a zero voltage is generated at the sub module connection terminals 16 and 17, a direct current can flow via the entire power switching unit 9. Owing to the ohmic resistance of the numerous series-connected power semiconductors 13, 14, such a high voltage drop is set across the power switching unit 9, however, that a direct current flows exclusively via the operating current path 5 when the mechanical switch 7 is closed.

In the exemplary embodiment shown in FIG. 1, the current flows from the left to right, i.e. from the connection terminal 2 to the connection terminal 3. If there is a short circuit in the direction of said current flow downstream of the device 1, a steep rise in the current flowing via the operating current path 5 takes place. The thus induced change in the magnetic flux in the inductive component part 8 induces a voltage in the inductive component part 8, which ensures that the short-circuit current commutates from the operating current path 5 into the disconnection current branch 6. The inductive component part 8 has an inductance $L_3$ which is low in relation to the line inductance $L_N$, but high in relation to the inductance of the power switching unit 9. The constant load current continues to flow in the operating current path 5 even in the event of a short circuit, however. This load current can likewise be commutated into the disconnection branch by corresponding driving of the power switching unit 9 by virtue of such a voltage being set at the power switching unit 9 that a circulating current flows in the mesh formed from the operating current path 5 and the disconnection branch, which circulating current is in opposition to the operating current in the mechanical switch 7 and to the short-circuit current components flowing there and ensures a zero crossing of the total current. The mechanical switch 7 can then open virtually in the deenergized state. The power which is required by the power electronics 9 to generate a current zero crossing in the mechanical switch 7 is therefore considerably reduced by the inductive component part 8.

Figure 2:
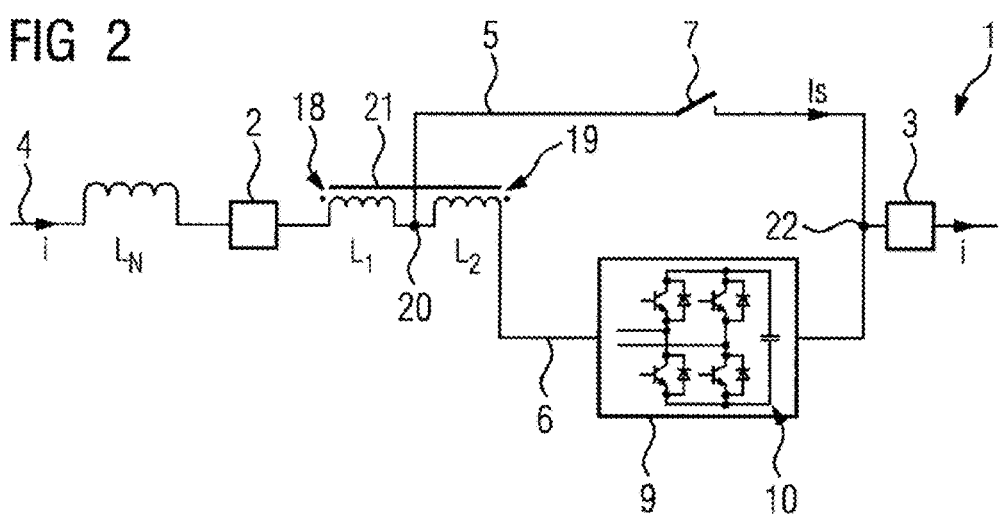
FIG. 2 shows a further exemplary embodiment of the device according to the invention.

FIG. 2 shows a further exemplary embodiment of the device 1 according to the invention, which differs from the exemplary embodiment illustrated in FIG. 1 in that the commutation means have two inductive component parts 18 and 19, which are in turn both in the form of a coil or inductor. The inductive component part 18 is arranged between one of the connection terminals 2 and a first junction 20 between the operating current path 5 and the disconnection current branch 6. The further inductive component part 19 is only in the disconnection branch 6. It can be seen that the inductive component parts 18 and 19 are coupled inductively to one another by a core 21 consisting of a ferromagnetic material, in this case iron. The component part 19 has a winding sense which is opposite the winding sense of the component part 18. In other words, the inductive component parts 18 and 19 have opposite winding directions.

In this case, the number of windings of the two inductive component parts 18, 19 can be the same. Given a constant load current, which flows from left to right in FIG. 2, as indicated, the inductance of the inductive component parts 18 and 19 is irrelevant. Owing to the voltage drop across the power switching unit 9, the constant load current flows via the operating current path 5, however. In this normal state, the mechanical switch 7 is of course closed. In the event of a short circuit downstream of the device 1 in the direction of current flow, a current rise di/dt of greater than zero arises. If the changing current flows both through the inductive component part 18 and through the inductive component part 19, said current generates a change in the magnetic flux, which is compensated for in the core 21, via which the inductive component parts 18 and 19 are coupled. For this current, therefore, virtually no inductance is effective. A current flowing via the operating current path, on the other hand, flows exclusively through the inductive component part 18 with the inductance L1. This inductance L1 is effective for said current and ensures commutation of said current into the disconnection branch 6. The power switching unit 9 can now generate a circulating current, which only reduces the remaining substantially constant component of the load current to zero by generation of a countercurrent in the switch 7.

If the number of windings of the inductive component part 19 in the disconnection branch 6 is less than the number of windings of the inductive component part 18, the inductance $L_2$ of the inductive component part 19 in the disconnection branch is less than the inductance $L_1$ of the inductive component part 18. A change in current, such as in the case of a current rise owing to a short circuit in $L_1$, for example, results in a change in the magnetic flux in the core 21. A magnetic flux is also induced in the inductive component part 19, and this counteracts the cause thereof. Owing to the lower turns number of the inductive component part 19, more current will flow there than via the inductive component part 18, with the result that the magnetic fluxes in the core 21 can compensate for one another. The current therefore increases to a greater extent in the component part 19 than the fault current. The additional current rise causes a circulating current in the mesh formed by the disconnection branch 6 and the operating current path 5. The circulating current is effected by the lower inductance $L_2$ of the inductive component part 19 in the disconnection branch. It flows in the same direction as the short-circuit current in the disconnection branch 6. However, in the operating current path 5, it flows in the opposite direction to the load current flowing there and the short-circuit current component which is lower there. This circulating current therefore results in a reduction in the current in the mechanical switch 7. Given suitable dimensioning of the component parts, the current via the switch 7 can be virtually suppressed. The additional intervention of power electronics of the power switching unit 9 for generating a current zero crossing in the switch 7 is therefore unnecessary. The commutation is effected purely by passive components, namely by the inductive component parts 18 and 19 and the inductive coupling thereof via the core 21.

Figure 3:
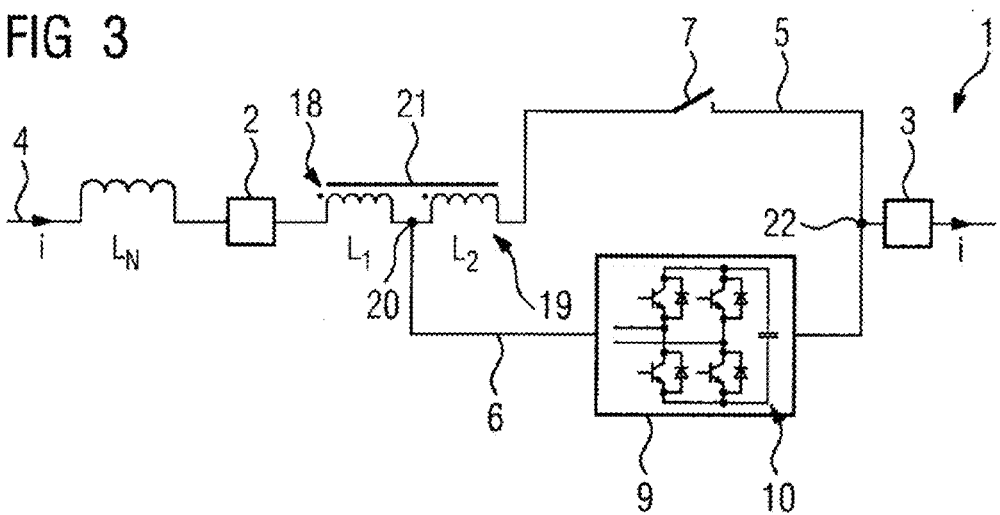
FIG. 3 shows a further exemplary embodiment of the device according to the invention.

FIG. 3 shows a further exemplary embodiment of the device 1 according to the invention, which differs from the exemplary embodiment shown in FIG. 2 in that the second inductance 19 is no longer arranged in the disconnection branch 6, but in the operating current path 5. In this variant, therefore, the constant load current flows in the direction indicated by the arrows in FIG. 5 in the low-resistance operating current path 5 and, as in the other exemplary embodiments, causes a certain bias of the core 21. A current gradient brought about owing to a short circuit, for example, in the inductive component part 18 with the inductance $L_1$ effects a change in magnetic flux in the core 21, as a result of which a current is set in the inductive component part 19 with the inductance $L_2$, which current is in opposition to its cause and suppresses a change in flux in the core 21. If the inductive component part 18 and the inductive component part 19 each have the same number of windings, a change in current di/dt in the inductive component part 18 with the inductance $L_1$ generates a change in magnetic flux. In the inductive component part 19 with the inductance $L_2$, the same current rise is set owing to the same turns number, in order that the two magnetic fluxes in the core 21 compensate for one another. The current rise in the inductive component part 19 and therefore also in the switch 7 is negative with respect to the constant load current and therefore sooner or later results in a current equal to zero in the switch 7. The lower the ratio between the inductances $L_2/L_1$, the earlier a current zero crossing in the switch 7 arises. In this case too, the commutation of the current from the operating current path 5 into the disconnection branch 6 can be assisted by the power electronics of the power switching unit 9. Given suitable dimensioning of the inductive component parts 18 and 19, however, commutation exclusively by means of the passive inductive component parts 18 and 19 is possible.

Figure 4:
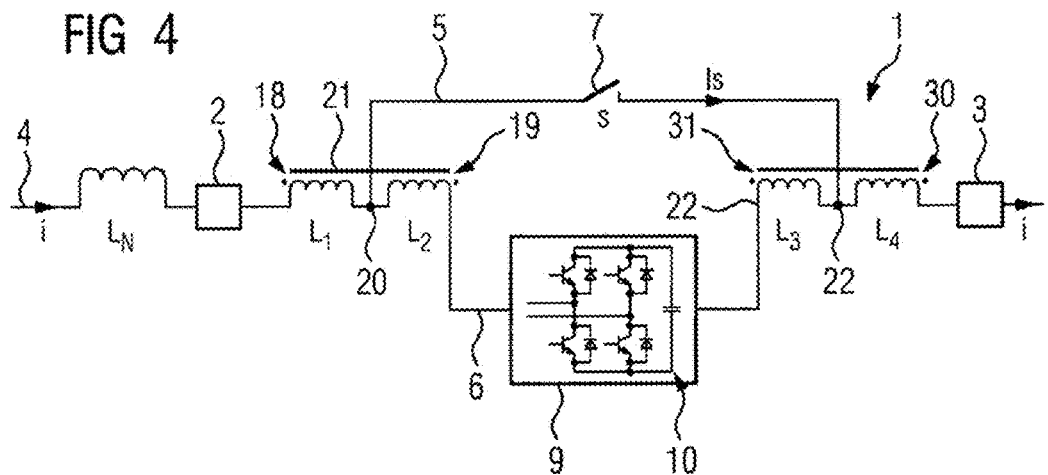
FIG. 4 shows a further exemplary embodiment of the device according to the invention.
Figure 5:
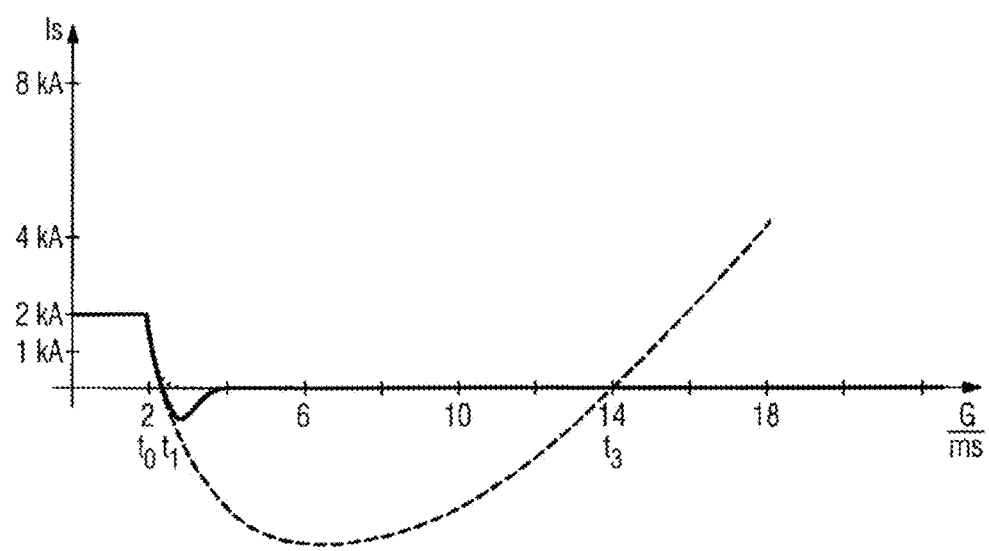
FIG. 5 shows a graph for schematically illustrating current profiles.

FIG. 4 shows a further variant of the invention. It can be seen that, in addition to the component parts already described in connection with FIG. 2, which are configured correspondingly here or can be configured correspondingly here, further inductive component parts are provided. Thus, a second inductive component part 30 in the form of a coil or inductor with the inductance $L_3$ is arranged between the second connection 3 and the second junction 22. The inductive component part 30 is inductively coupled to an inductive component part 31 arranged in the disconnection current branch 6, which component part 31 has the inductance $L_4$. Again a core 21 consisting of a ferromagnetic material is used for the inductive coupling. The mode of operation of the two additional inductive component parts 30 and 31 corresponds to the mode of operation already described of the inductive components 18 and 19. The inductive component part 31 can of course also be arranged in the operating current path 5 within the scope of the invention, on the basis of the exemplary embodiment shown in FIG. 3. FIG. 5 shows, with respect to a device 1 shown in FIG. 2, schematically with the aid of the dashed line, the profile of the current $I_s$ in the operating current path 5 from left to right in the event of a short circuit at time $t_0$. In FIG. 5, $t_0$ is at 2 ms. The current profile $I_s$ experiences a zero crossing very quickly, i.e. after 500 µs, at $t_1$, where the following applies: $t_1=t_0+500$ µs. The 500 µs are in this case to be understood purely by way of example. However, it is essential that the duration after the occurrence of the fault up to the first current zero crossing is much less than 1 ms. Since the customary switching delay time is approximately 2 ms, the first current zero crossing cannot be used to open the mechanical switch 7 virtually in the deenergized state. However, it is apparent from FIG. 5 that a second current zero crossing arises at time $t_3$. Since a very large amount of time can pass between $t_0$ and $t_3$, it is not possible to wait for the second current zero crossing in some applications. As has already been mentioned several times, however, active commutation means can be part of the disconnection unit 9, drive a circulating current in the mesh formed from the operating current path 5 and the disconnection current branch 6, which circulating current is in opposition to the current in the switch 7. This circulating current accelerates the occurrence of the second current zero crossing. The current profile $I_s$ in the switch 7 with active commutation is illustrated schematically in FIG. 5 with the aid of the continuous line. It can be seen that a second current zero crossing can thus be brought about even after 2 ms, wherein the current then remains virtually at zero.

Figure 6:
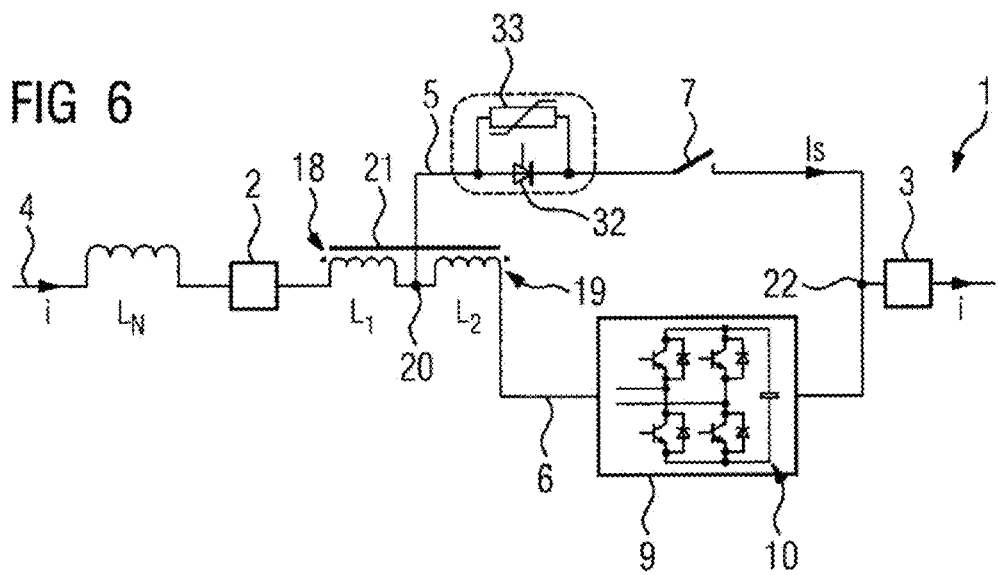
FIG. 6 shows a further exemplary embodiment of the device according to the invention.

Furthermore, FIG. 5 shows a third current profile by means of a dotted line. Such a current profile can be obtained using a device as shown in FIG. 6, which largely corresponds to the exemplary embodiment shown in FIG. 2, but a thyristor 32 is arranged in the operating current path 5, with a surge arrestor 33 connected in parallel with said thyristor. The thyristor 32 is a controllable power semiconductor switch which cannot be actively switched off, however.

During rated operation, the current via the operating current path 5 and therefore via the thyristor 32 and the mechanical switch 7 flows from connection 2 to connection 3, for example. During rated operation, the thyristor 32 is permanently refired in order to ensure its conductivity. In the event of a short circuit downstream of the device 1 according to the invention in the direction of current flow, a current rise $d_i$ arises after $d_t$, with the result that the inductive component parts 18 and 19 which are coupled inductively to one another via the ferromagnetic core 21 ensure a quick current zero crossing at time $t_1$ (see FIG. 5), i.e. already after 500 µs. Since the thyristor 32 is not conductive in the reverse direction, the current flowing via the operating current path 5 remains at zero after time $t_1$. If the firing commands to the thyristor 32 are suppressed, the current flow remains equal to zero even when a positive current wishes to be set again, i.e. from connection terminal 2 to connection terminal 3. A corresponding hold-off time for the thyristor 32 is provided. The surge arrestor 33, which is connected in parallel with the thyristor 32, is a varistor, for example. This varistor is dimensioned such that, in the case of the occurrence of TRV, practically no current flow via the surge arrestor 33 is permitted. The mechanical switch in this exemplary embodiment can be opened in the fully deenergized state since a current flow from the thyristor is prevented. In this case, the thyristor only needs to be dimensioned for low voltages, voltages of markedly less than the DC rated voltage.

Figure 7:
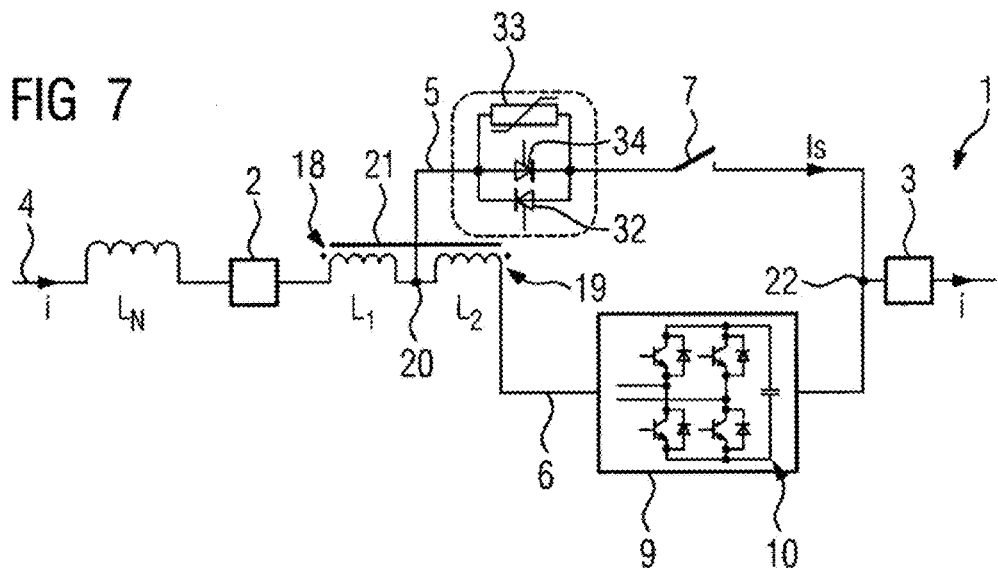
FIG. 7 shows a further exemplary embodiment of the device according to the invention.
Figure 8:
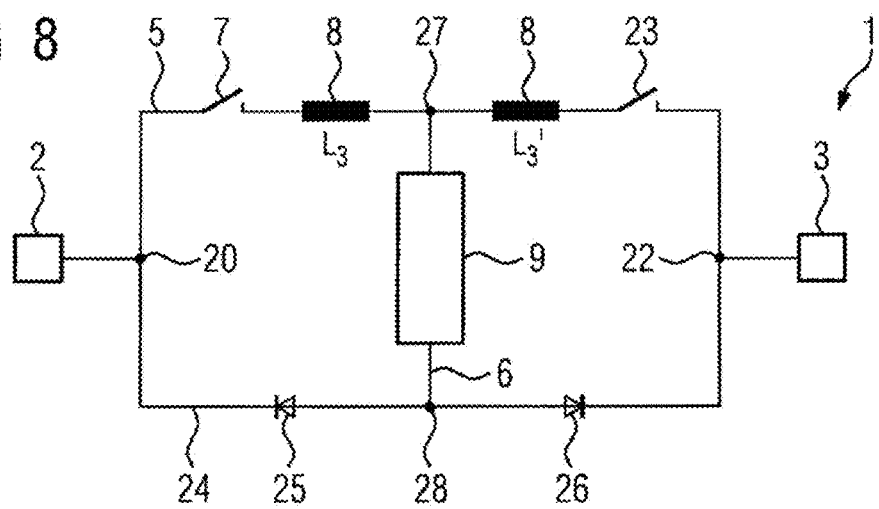
FIG. 8 shows a further exemplary embodiment of the device according to the invention.

FIG. 7 shows the exemplary embodiment shown in FIG. 6, but the circuit can be used for both current directions. For this purpose, a further thyristor 34 is provided, which is connected in parallel in opposition to the first thyristor 32. The mode of operation of the thyristors 32, 34 corresponds to the mode of operation explained in connection with the device 1 shown in FIG. 6, however, wherein the firing of the thyristors is interrupted in any case in the event of a fault. FIG. 8 shows a further configuration of the device 1 according to the invention, which corresponds to a so-called H circuit. In this exemplary embodiment of the device 1 according to the invention, two mechanical switches 7 and 23 are arranged in the operating current path 5. Furthermore, a shunt current branch 24 is provided, which extends connected in parallel with the operating current path 5 between the connection terminals 2 and 3, wherein two junctions 20 and 22 are formed between the operating current path 5 and the shunt current branch 24. Two diodes 25 and 26 are arranged as power semiconductors with mutually opposite forward direction in the shunt current branch 24. A central branch potential point 27 of the operating current path 5 is formed between the mechanical switches 7 and 23 of the operating current path 5. The central branch potential point 28 of the shunt current branch 24 is between the two diodes 25 and 26. The disconnection branch 6 comprising the power switching unit 9, which otherwise corresponds to the power switching unit 9 shown in FIGS. 1 to 6, extends between said two central branch potential points 27 and 28. Inductive component parts 8 which have the inductance L3 and L3', respectively, are again arranged between the central branch potential point 27 of the operating current path 5 and each mechanical switch 7 and 23. During normal operation, owing to the high voltage drop of the constant load current across the power switching unit 9, the current flows only via the operating current path 5, therefore through both switches 7 and 23 and the inductive component parts 8 arranged there. In the event of a current rise in the event of a short circuit, both inductive component parts 8 wish to prevent a current rise. Owing to the diodes 25 and 26 arranged in the shunt current branch 24, however, this can only take place in the branch whose switch is intended to be opened. If the current flows from connection terminal 2 to connection terminal 3, this is the mechanical switch 23. The current then commutates into the disconnection branch 6 and flows via the diode 26 to the connection terminal 3.

Figure 9:
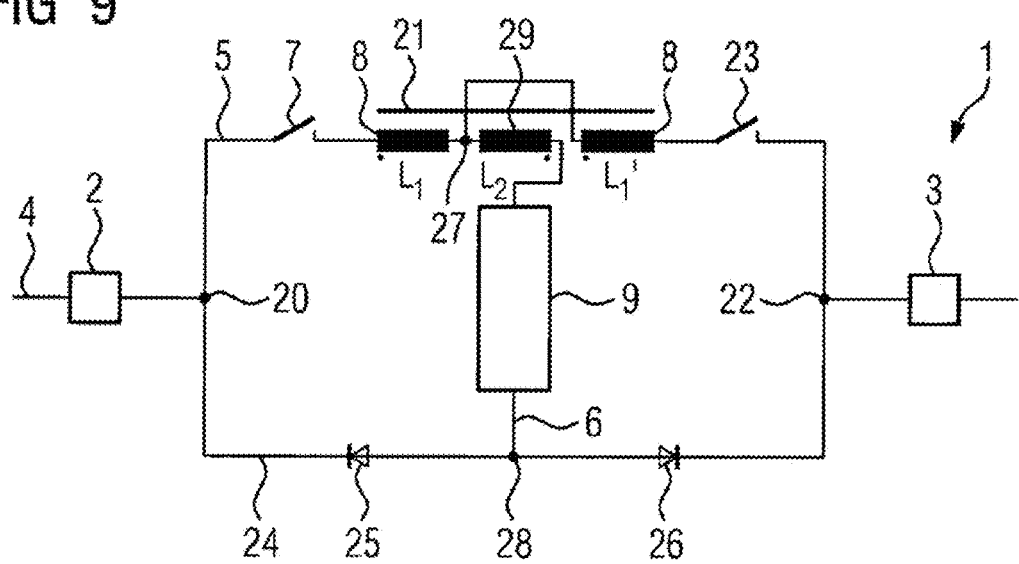
FIG. 9 shows a further exemplary embodiment of the device according to the invention, schematically.

FIG. 9 shows a further exemplary embodiment of the device 1 according to the invention. This exemplary embodiment differs from the variant shown in FIG. 7 in that, in addition to the two inductive component parts 8 in the operating current path 5, a further inductive component part 29 is arranged in the disconnection branch 6, wherein all three inductive component parts 8 and 29 are coupled inductively to one another via a core 21 consisting of a ferromagnetic material. During normal operation, the constant load current flows via the operating current branch 5 comprising the switches 7 and 23. In the event of a current rise as a result of a short circuit, the inductive component parts 8 and 29 are effective, wherein, owing to the orientation of the diodes 25 and 26, the current commutates into the disconnection branch 6. Owing to the inductive component part 29 in the disconnection branch 6, which has an opposite winding direction and the same turns number with respect to the inductive component part 8 in the operating current path, an effective inductance of zero is set owing to the inductive coupling by the core 21 for the current commutated into the disconnection branch 6. This favors commutation of the current into the disconnection branch 6 even more.

In a further variant which is not illustrated in the figures, the third inductive component part 29 in the disconnection branch 6 is missing, wherein the inductive component parts 8 in the operating current path 5 are coupled to one another. In this variant, the current rise in the switch 23 to be opened is prevented. The constant load current also continues to flow via the switch 23, however. In this configuration, therefore, the power electronics of the disconnection unit 9 needs to ensure active commutation of the remaining current flowing via the switch 23. This can take place, for example, by inducing a current flowing via the junctions 27, 28 and 22, the direction of said current being in the opposite direction to the constant load current in the operating current path.

The invention claimed is:

1. A device for switching a direct current in a pole of a direct current network, the device comprising:
   two connection terminals for connection in series to the pole;
   an operating current path extending between said connection terminals, said operating current path having two mechanical switches and a central branch potential point disposed between said two mechanical switches;
   a shunt current branch extending in a circuit being parallel to said operating current path between said connection terminals, said shunt current branch including at least one of said two mechanical switches or two power semiconductors and said shunt current branch having a central branch potential point disposed between said at least one of two mechanical switches or two power semiconductors;
   a disconnection branch having a power switching unit for disconnecting high fault currents, said power switching unit having a power semiconductor switch configured to be switched on and off;
   a commutation device for commutating a current from said operating current path onto said disconnection branch, said commutation device having at least one inductive component part; and
   said disconnection branch connecting said central branch potential point of said operating current path to said central branch potential point of said shunt current branch.

2. The device according to claim 1, wherein said commutation device has drivable power semiconductor switches being at least partially constructed to generate a back-emf suppressing fault currents in said at least one mechanical switch to be opened.

3. The device according to claim 2, wherein said drivable power semiconductor switches include at least one thyristor disposed in said operating current path.

4. The device according to claim 1, wherein said at least one inductive component part of said commutation device includes at least two inductive component parts being coupled inductively to one another.

5. The device according to claim 1, which further comprises inductive component parts disposed at least one of between said central branch potential point of said operating current path and one of said mechanical switches or between said central branch potential point of said shunt current branch and one of said at least one of two mechanical switches or two power semiconductors.

6. The device according to claim 5, which further comprises at least one inductive component part disposed in said disconnection branch and inductively coupled to at least one inductive component part of at least one of said operating current path or said shunt current branch.

7. The device according to claim 1, wherein said disconnection branch is configured to bypass a section of said operating current path, and at least one inductive component part is disposed in said section of said operating current path being bypassed by said disconnection branch.

8. A device for switching a direct current in a pole of a direct current network, the device comprising:
   two connection terminals for connection in series to the pole;
   an operating current path extending between said connection terminals, said operating current path having at least one mechanical switch;
   a disconnection branch configured to bypass said operating current path, said disconnection branch having a power switching unit for disconnecting high fault currents, said power switching unit having a power semiconductor switch configured to be switched on and off;
   a commutation device for commutating a current from said operating current path onto said disconnection branch, said commutation device having at least one inductive component part;
   junctions each disposed between said operating current path and said disconnection branch;
   inductive component parts each disposed between a respective one of said connection terminals and a respective one of said junctions; and
   further inductive component parts each disposed in said operating current path or in said disconnection branch and each inductively coupled to a respective one of said inductive component parts.

9. A device for switching a direct current in a pole of a direct current network, the device comprising:
   two connection terminals for connection in series to the pole;
   an operating current path extending between said connection terminals, said operating current path having at least one mechanical switch;
   a disconnection branch configured to bypass said operating current path, said disconnection branch having a power switching unit for disconnecting high fault currents, said power switching unit having a power semiconductor switch configured to be switched on and off;
   a commutation device for commutating a current from said operating current path onto said disconnection branch, said commutation device having at least one inductive component part;
   a junction between said operating current path and said disconnection branch;

an inductive component part disposed between a connection terminal and said junction; and a further inductive component part disposed in said operating current path or in said disconnection branch and inductively coupled to said inductive component part;

said inductive component parts being inductively coupled to one another have windings with mutually opposite winding directions.

10. The device according to claim 9, wherein said two inductive component parts have the same number of windings.

11. The device according to claim 9, wherein said two inductive component parts being coupled inductively to one another have a different number of windings.

12. A device for switching a direct current in a pole of a direct current network, the device comprising:

two connection terminals for connection in series to the pole;

an operating current path extending between said connection terminals, said operating current path having at least one mechanical switch;

a disconnection branch having a power switching unit for disconnecting high fault currents, said power switching unit having a power semiconductor switch configured to be switched on and off;

said power switching unit having a series circuit including two-pole sub modules having at least one said power semiconductor switch configured to be switched on and off and a device for decaying energy released during switching; and a commutation device for commutating a current from said operating current path onto said disconnection branch, said commutation device having at least one inductive component part;

each of said sub modules having two connection terminals, an energy storage device and a power semiconductor circuit connected in parallel with said energy storage device, permitting either a voltage drop across said energy storage device or a zero voltage to be generated at said two connection terminals of each of said sub modules.

13. The device according to claim 1, wherein said commutation device exclusively includes inductive component parts.

* * * * *